United States Patent
Ilich

(10) Patent No.: US 7,207,609 B2
(45) Date of Patent: *Apr. 24, 2007

(54) VACUUM ASSISTED METHODS OF REMOVING EGGS

(75) Inventor: Robert L. Ilich, Wake Forest, NC (US)

(73) Assignee: Embrex, Inc., Durham, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 11/129,829

(22) Filed: May 16, 2005

(65) Prior Publication Data

US 2005/0218677 A1    Oct. 6, 2005

Related U.S. Application Data

(63) Continuation of application No. 10/680,762, filed on Oct. 7, 2003.

(60) Provisional application No. 60/441,343, filed on Jan. 21, 2003.

(51) Int. Cl.
*B66C 1/02* (2006.01)
*B25J 15/06* (2006.01)

(52) U.S. Cl. .................... 294/64.2; 294/65; 294/87.12

(58) Field of Classification Search ............... 294/64.1, 294/64.2, 64.3, 65, 87.12; 134/21, 25.1, 134/42; 119/6.8; 414/627, 737
See application file for complete search history.

(56) References Cited

U.S. PATENT DOCUMENTS

| | | | | |
|---|---|---|---|---|
| 3,077,993 A | * | 2/1963 | Mulvany et al. ........... | 294/64.1 |
| 3,349,927 A | * | 10/1967 | Blatt ........................ | 294/64.2 |
| 3,637,249 A | | 1/1972 | Kuhl et al. | |
| 3,716,307 A | * | 2/1973 | Hansen ...................... | 294/64.2 |
| 4,073,602 A | * | 2/1978 | Cagle ......................... | 294/64.2 |
| 4,302,142 A | | 11/1981 | Kuhl et al. | |
| 4,499,623 A | | 2/1985 | Kuhl | |
| 4,553,661 A | | 11/1985 | van der Schoot | |
| 4,671,652 A | * | 6/1987 | van Asselt et al. .......... | 356/66 |
| 4,681,063 A | | 7/1987 | Hebrank | |
| 4,698,867 A | | 10/1987 | Kuhl | |
| 4,698,868 A | | 10/1987 | Kuhl | |
| 4,699,559 A | * | 10/1987 | Bibbo et al. ................ | 198/428 |
| 4,704,755 A | | 11/1987 | Kuhl | |
| 4,724,854 A | | 2/1988 | Kuhl | |
| 4,750,277 A | | 6/1988 | Kuhl | |
| 5,017,003 A | | 5/1991 | Keromnes et al. | |
| 5,344,202 A | | 9/1994 | Ramler et al. | |
| 5,898,488 A | | 4/1999 | Kuhl | |
| 6,039,529 A | * | 3/2000 | Persson ..................... | 294/64.1 |
| 6,042,341 A | * | 3/2000 | Richter ....................... | 417/151 |
| 6,149,375 A | * | 11/2000 | Hebrank ..................... | 294/65 |
| 6,305,184 B1 | | 10/2001 | Kuhl | |
| 2003/0230694 A1 | * | 12/2003 | Kalb .......................... | 248/363 |

\* cited by examiner

*Primary Examiner*—Patrick Mackey
*Assistant Examiner*—Paul T. Chin
(74) *Attorney, Agent, or Firm*—Myers Bigel Sibley & Sajovec

(57) ABSTRACT

Egg lifting apparatus are provided that include a vacuum housing having first and second passageways, a venturi assembly in fluid communication with the first and second passageways, and a flexible cup secured to the vacuum housing, wherein the flexible cup has an interior that is in fluid communication with the vacuum housing second passageway. The venturi assembly produces subatmospheric pressure within the second passageway upon the flow of air through the first passageway. The flexible cup is configured to engage and retain an egg in seated relation therewith when subatmospheric pressure is provided within the flexible cup interior via the vacuum housing second passageway.

10 Claims, 9 Drawing Sheets

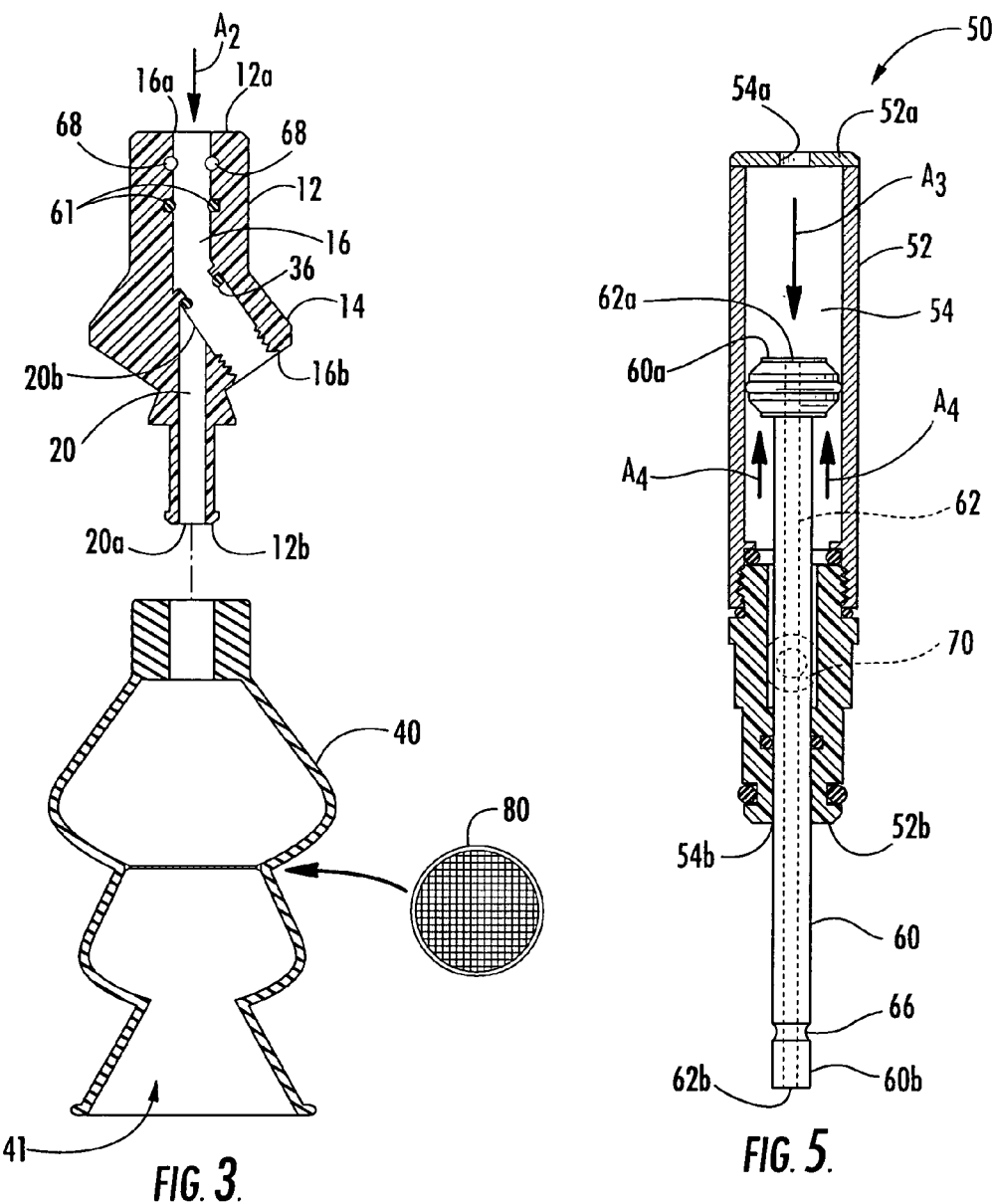
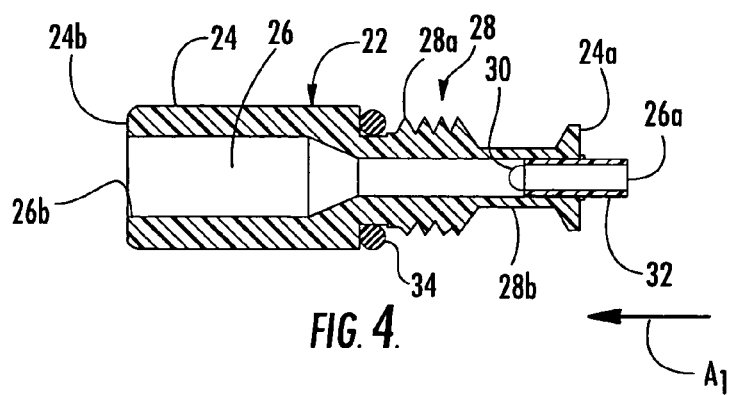
FIG. 3.
FIG. 5.
FIG. 4.

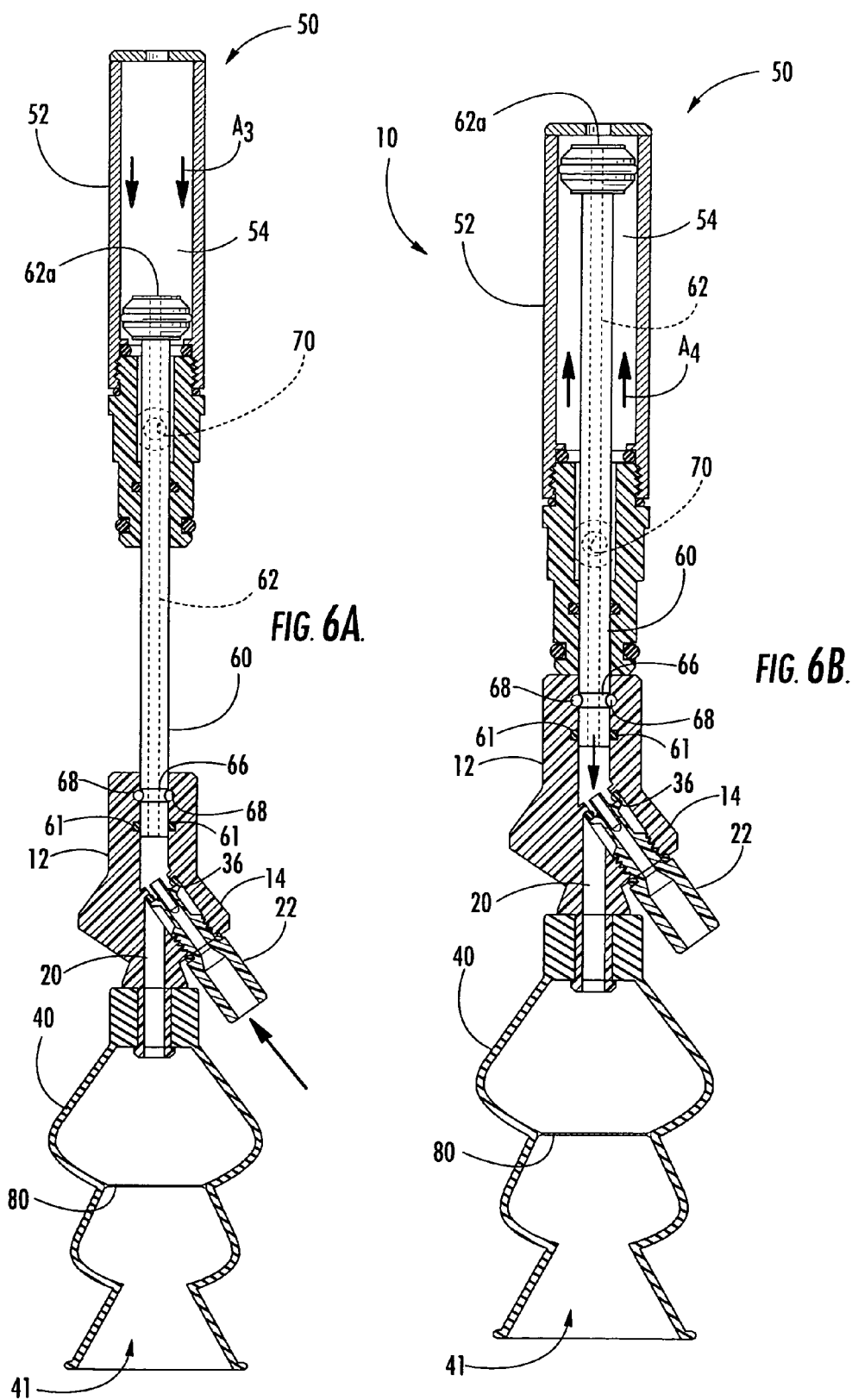

VACUUM ASSISTED METHODS OF REMOVING EGGS

RELATED APPLICATION

This application is a continuation of application Ser. No. 10/680,762, filed Oct. 7, 2003, entitled Vacuum Assisted Methods of Removing Eggs, which claims the benefit of U.S. Provisional Application No. 60/441,343 filed Jan. 21, 2003, entitled Egg Lifting Apparatus, all of which are assigned to the assignee of the present application, the disclosures of all of which are hereby incorporated herein by reference in their entireties as if set forth fully herein.

FIELD OF THE INVENTION

The present invention relates generally to eggs and, more particularly, to egg handling apparatus.

BACKGROUND OF THE INVENTION

Discrimination between poultry eggs on the basis of some observable quality is a well-known and long-used practice in the poultry industry. "Candling" is a common name for one such technique, a term which has its roots in the original practice of inspecting an egg using the light from a candle. Eggs which are to be hatched to live poultry are typically candled during embryonic development to identify clear, rotted, and dead eggs (collectively referred to herein as "non-live eggs"). It is a common practice to remove non-live eggs from live eggs to increase available incubator space, to reduce the risk of contamination, and to save vaccine costs related to in ovo inoculations.

Conventionally, eggs designated as non-live are removed either by hand or via an automated egg removal device. Automated egg removal devices conventionally employ suction-type lifting devices as disclosed in U.S. Pat. No. 4,681,063 or in U.S. Pat. No. 5,017,003 to Keromnes et al. The poultry industry is constantly looking for improved ways of separating live and non-live eggs that are efficient, that reduce costs, and that reduce the risk of contamination to live eggs.

SUMMARY OF THE INVENTION

In view of the above discussion, egg lifting apparatus are provided that include a vacuum housing having first and second passageways, a venturi assembly in fluid communication with the first and second passageways, and a flexible cup secured to the vacuum housing, wherein the flexible cup comprises an interior that is in fluid communication with the vacuum housing second passageway. The venturi assembly produces subatmospheric pressure (vacuum) within the second passageway upon the flow of air through the first passageway. The flexible cup is configured to engage and retain an egg in seated relation therewith when subatmospheric pressure is provided within the flexible cup interior via the vacuum housing second passageway.

According to embodiments of the present invention, the egg lifting apparatus includes a plunger housing and an elongated plunger operably associated therewith. The plunger housing includes opposite first and second ends and an axially-extending internal bore that terminates at respective first and second openings in the plunger housing first and second ends. The elongated plunger includes opposite first and second ends and an axially-extending internal bore that terminates at respective first and second ports in the plunger first and second ends. The plunger first end is slidably secured within the plunger housing internal bore and the plunger second end extends from the plunger housing second opening and is secured to the vacuum housing first end such that the plunger axial bore is in communication with the vacuum housing first passageway and with the plunger housing first opening. The plunger second end is removably secured to the vacuum housing first end. The plunger is configured for reciprocal movement between an extended and retracted position relative to the plunger housing. The plunger is moved to an extended position upon the flow of air through the second port into the plunger housing internal bore through the plunger housing first opening.

According to embodiments of the present invention, the plunger housing includes a third opening that is in communication with the plunger housing internal bore. The plunger is moved to a retracted position upon the flow of air through the second port into the plunger housing bore.

According to embodiments of the present invention, the venturi assembly and/or the flexible cup are removably secured to the vacuum housing. According to embodiments of the present invention, a screen is positioned within the interior of the flexible cup and is configured to prevent foreign matter from being pulled into the second passageway of the vacuum housing.

According to embodiments of the present invention, an apparatus for removing eggs from an egg carrier includes a frame, a pressurized air source, and a platform comprising an array of the egg lifting devices.

According to embodiments of the present invention, a method of cleaning and/or sterilizing the egg lifting apparatus includes immersing the flexible cup in a bath of cleaning solution, and inducing vacuum within the interior of the vacuum cup by forcing air flow through the vacuum housing first passageway, wherein contaminants are pulled upwardly through the second passageway and out the venturi assembly.

BRIEF DESCRIPTION OF THE DRAWINGS

FIG. 3 is a detailed view of the vacuum housing and flexible vacuum cup of the egg lifting apparatus of FIG. 1.

FIG. 4 is a detailed view of the venturi assembly of the egg lifting apparatus of FIG. 1.

FIG. 5 is a detailed view of the plunger and plunger housing of the egg lifting apparatus of FIG. 1.

FIGS. 6A and 6B illustrate the plunger in extended and retracted positions, respectively.

DETAILED DESCRIPTION OF THE INVENTION

Figure 1:
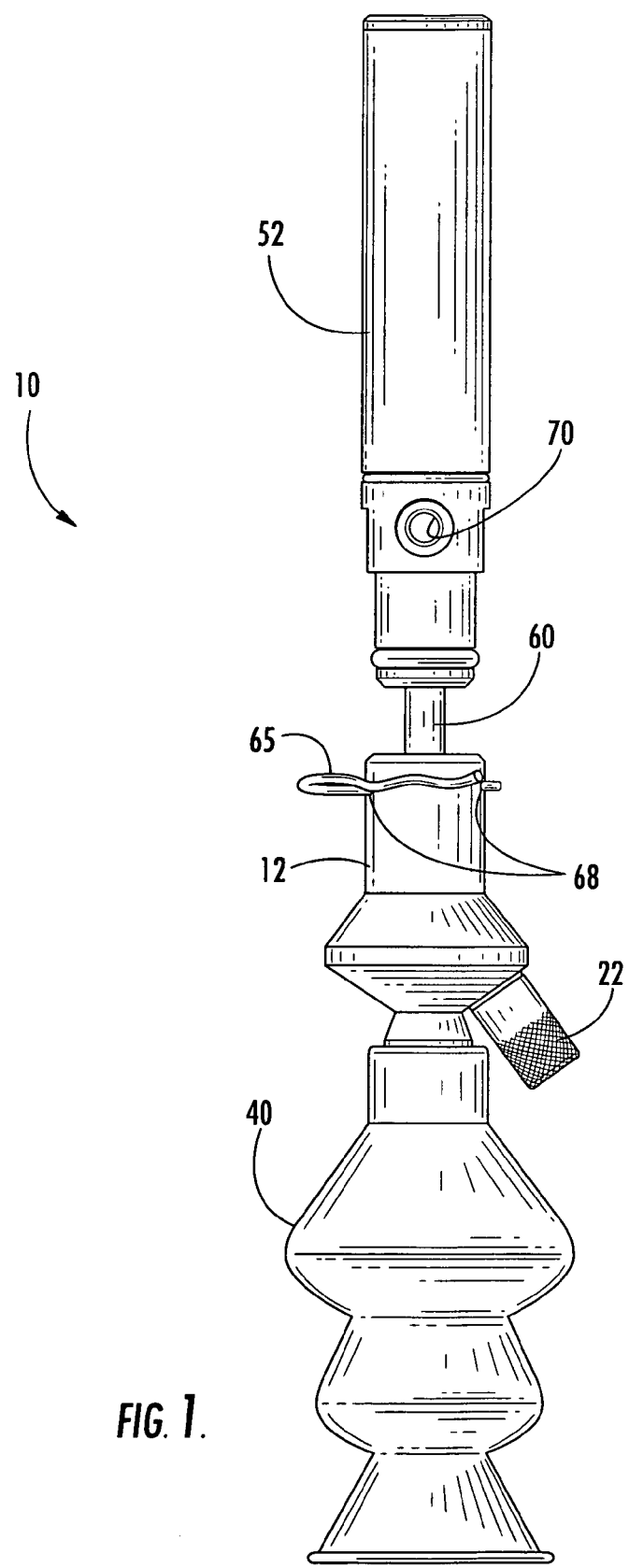
FIG. 1 is a side view of an egg lifting apparatus, according to embodiments of the present invention.
Figure 2:
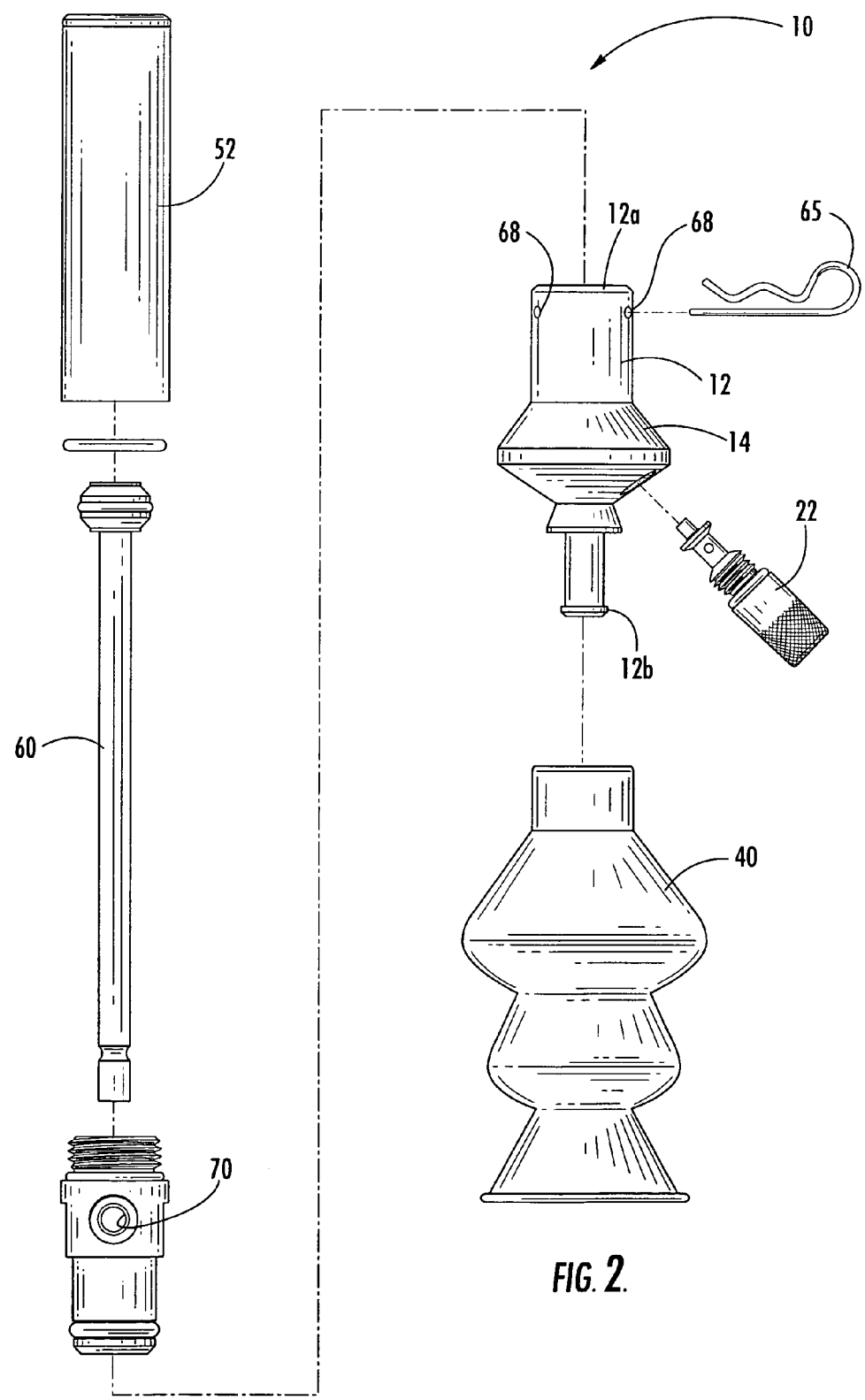
FIG. 2 is an exploded view of the egg lifting apparatus of FIG. 1 that illustrates the various components thereof.

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used in the description of the invention and the appended claims, the singular forms "a", "an" and "the" are intended to include the plural forms as well, unless the context clearly indicates otherwise.

All publications, patent applications, patents, and other references mentioned herein are incorporated by reference in their entirety.

In the drawings, the thickness of lines, layers and regions may be exaggerated for clarity. It will be understood that when an element is referred to as being "on" another element, it can be directly on the other element or intervening elements may also be present. In contrast, when an element is referred to as being "directly on" another element, there are no intervening elements present. It will be understood that when an element is referred to as being "connected" or "attached" to another element, it can be directly connected or attached to the other element or intervening elements may also be present. In contrast, when an element is referred to as being "directly connected" or "directly attached" to another element, there are no intervening elements present. The terms "upwardly", "downwardly", "vertical", "horizontal" and the like are used herein for the purpose of explanation only.

Egg lifting apparatus according to embodiments of the present invention may be utilized for lifting and transferring various types and sizes of eggs and in conjunction with various egg processing techniques (e.g., in ovo inoculation, in ovo virus cultivations, etc.). Egg lifting apparatus according to embodiments of the present invention may be used with any types of avian eggs including, but not limited to, chicken eggs, turkey eggs, duck eggs, geese eggs, quail eggs, pheasant eggs, exotic bird eggs, etc.

Referring now to FIGS. 1–7, an egg lifting apparatus 10, according to embodiments of the present invention is illustrated. The illustrated egg lifting apparatus 10 includes a vacuum housing 12. The vacuum housing 12 includes opposite first and second ends 12a, 12b, and an intermediate portion 14 between the first and second ends 12a, 12b. A first passageway 16 extends through the vacuum housing 12 between an inlet 16a in the vacuum housing first end 12a and an outlet 16b in the intermediate portion 14.

A second passageway 20 extends through the vacuum housing 12 between an inlet 20a in the vacuum housing second end 12b and an outlet 20b that is in communication with the first passageway 16. A venturi assembly 22 is configured to be removably secured within the first passageway outlet 16b and is in communication with the first passageway 16 when secured in the first passageway outlet 16b.

The illustrated venturi assembly 22 includes a body portion 24 having opposite first and second end portions 24a, 24b. An axially-extending internal passageway 26 extends between the first and second end portions 24a, 24b, as illustrated. The illustrated body portion 24 includes a throat section 28 adjacent the first end portion 24a that includes a threaded portion 28a and a neck portion 28b. A pair of apertures 30 are formed in the neck portion 28b and are in communication with the internal passageway 26. (However, a single aperture 30, or more than two apertures 30, may be utilized according to other embodiments of the present invention.) A nozzle 32 extends from the first end portion 24a as illustrated and is in communication with the internal passageway 26. An O-ring 34 surrounds the throat section 28 adjacent the threaded portion 28a, as illustrated and is used to seal the venturi assembly 22 within the vacuum housing 12 as will be described below.

The flow of air through the venturi internal passageway 26 from the passageway inlet 26a in nozzle 32 to the passageway outlet 26b (direction also indicated by arrow $A_1$) will induce subatmospheric pressure (i.e., vacuum) in the region of the throat section 28 at apertures 30. This region of reduced pressure is employed to induce a vacuum within the interior 41 of a flexible vacuum cup 40 attached to the vacuum housing second end 12b, as will be described below.

Figure 7:
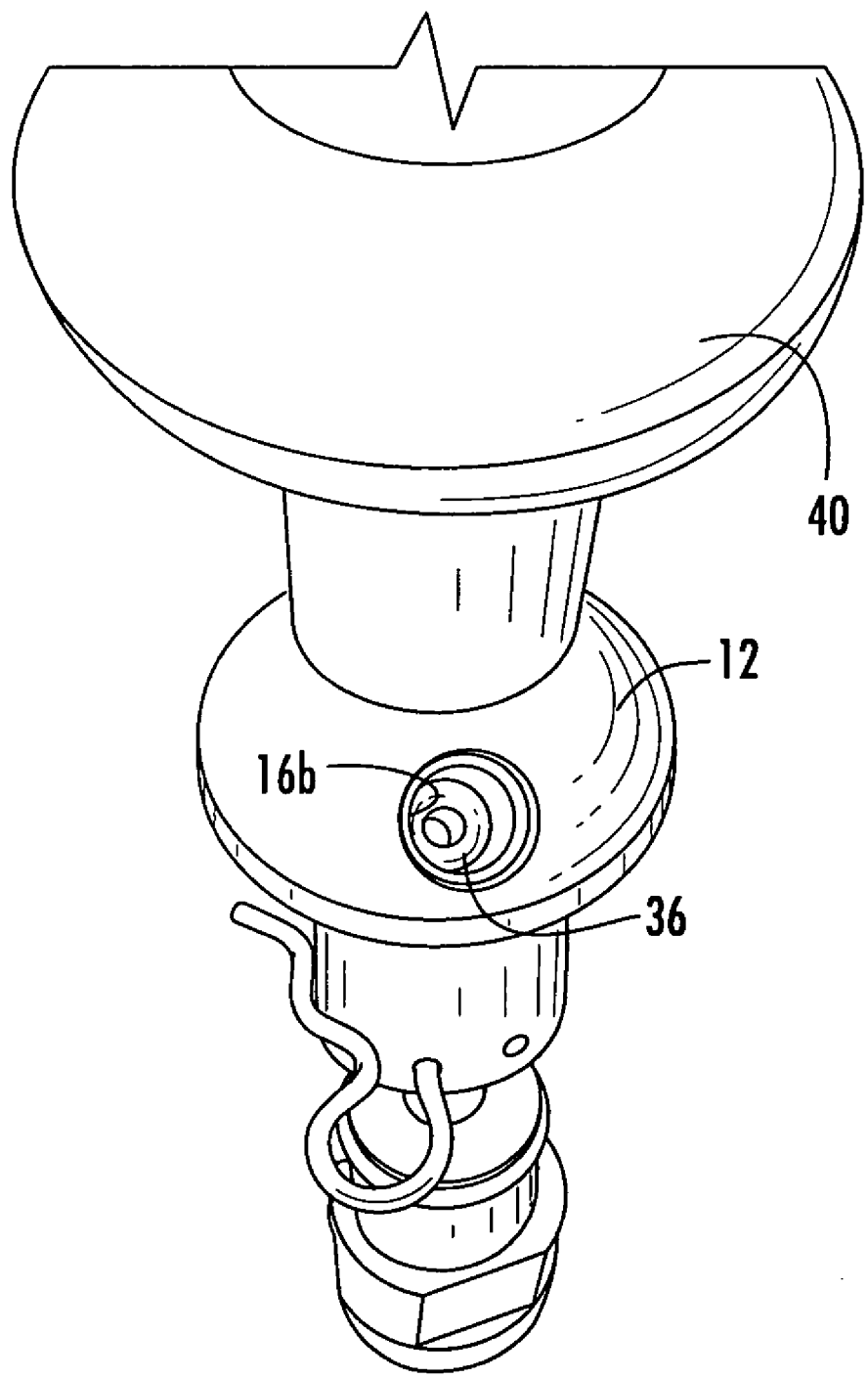
FIG. 7 is a perspective view of the egg lifting apparatus of FIG. 1 illustrating the first passageway outlet in the vacuum housing and the seal therewithin that prevents air flow through the first passageway from entering the second passageway in the vacuum housing.

The illustrated venturi assembly 22 is configured to be removably secured within the first passageway outlet 16b of the vacuum housing 12. A portion of the first passageway outlet 16b is threaded so as to threadingly receive the threaded portion 28a of the venturi assembly 22. A seal 36 (e.g., an O-ring) is disposed within the first passageway outlet 16b as illustrated in FIGS. 3 and 7 and is configured to sealingly engage the body portion first end portion 24a of the venturi assembly 22 when the venturi assembly 22 is secured within the first passageway outlet 16b of the vacuum housing 12. O-ring seal 34 sealing engages the venturi assembly 22 against the intermediate portion 14 of the vacuum housing 12, as illustrated. When air flows into vacuum housing internal passageway inlet 16a (indicated by arrow $A_2$), the seal 36 prevents the flow of air into the vacuum housing second passageway 20. The throat section 28 containing apertures 30 is located adjacent the second passageway inlet 20b when the venturi assembly 22 is secured within the first passageway outlet 16b. Thus, when air flows into the vacuum housing internal passageway inlet 16a (indicated by arrow $A_2$), through the first passageway 16 and out venturi assembly internal passageway outlet 26b, subatmospheric pressure is induced within the second passageway and within the interior 41 of the flexible vacuum cup 40.

Embodiments of the present invention are not limited to the illustrated venturi assembly 22. Venturi assemblies having various configurations may be utilized in accordance with embodiments of the present invention.

A flexible vacuum cup 40 having an interior portion 41 is removably secured to the vacuum housing second end 12b and is in communication with the vacuum housing second passageway 20. The flexible vacuum cup 40 is configured to engage and retain an egg in seated relation therewith when subatmospheric pressure is provided within the flexible cup interior 41 via the second passageway 20.

The illustrated egg lifting apparatus 10 also includes a plunger assembly 50 that includes a plunger housing 52 and an elongated plunger 60. The illustrated plunger housing 52 includes opposite first and second ends 52a, 52b and an axially-extending internal bore 54 that terminates at respective first and second openings 54a, 54b in the plunger housing first and second ends 52a, 52b.

The elongated plunger 60 includes opposite first and second ends 60a, 60b and an axially-extending internal bore 62 that terminates at respective first and second ports 62a, 62b in the plunger first and second ends 60a, 60b. The plunger first end 60*a* is slidably secured within the plunger housing internal bore 54 and the plunger second end 60*b* extends from the plunger housing second opening 54*b*, as illustrated. The plunger second end 60*b* is removably secured to the vacuum housing first end 12*a* such that the plunger axial bore 62 is in communication with the vacuum housing first passageway 16 and with the plunger housing first opening 54*a*. The plunger 60 is configured for reciprocal movement between extended and retracted positions relative to the plunger housing 52. The plunger 60 moves to an extended position (FIG. 6A) upon the flow of air through the plunger housing bore 54 in the direction indicated by arrow $A_3$ (FIG. 5). The plunger first end portion 60*a* has an enlarged area that air impinges on to push the plunger 60 to the extended position. Air entering the plunger housing internal bore 54 also flows through the plunger internal bore 62 and into the vacuum housing first passageway 16 to create vacuum within the interior 41 of flexible vacuum cup 40.

In the illustrated embodiment, the plunger second end 60*b* is removably secured to the vacuum housing first end 12 and is held in place via pin 65. A pair of bores 68 extend through the vacuum housing 12 adjacent the first end 12*a* thereof as illustrated. Pin 65 is inserted in one of the bores 68 and engages keyway 66 that is adjacent to the plunger second end 60*b* to secure the plunger 60 within the vacuum housing 12. An O-ring 61 is also disposed within the first passageway 16 in the vacuum housing 12 to sealingly engage the plunger second end portion 60*a*.

The illustrated plunger housing 52 also includes a third opening 70 that is in communication with the plunger housing internal bore 54. When air flow is directed into the third opening 70, the air flows upwardly in the plunger housing internal bore 54 (indicated by arrows $A_4$) and impinges on the underside portion of plunger first end 60*a* and moves the plunger 60 to the retracted position (FIG. 6B).

Figure 8:
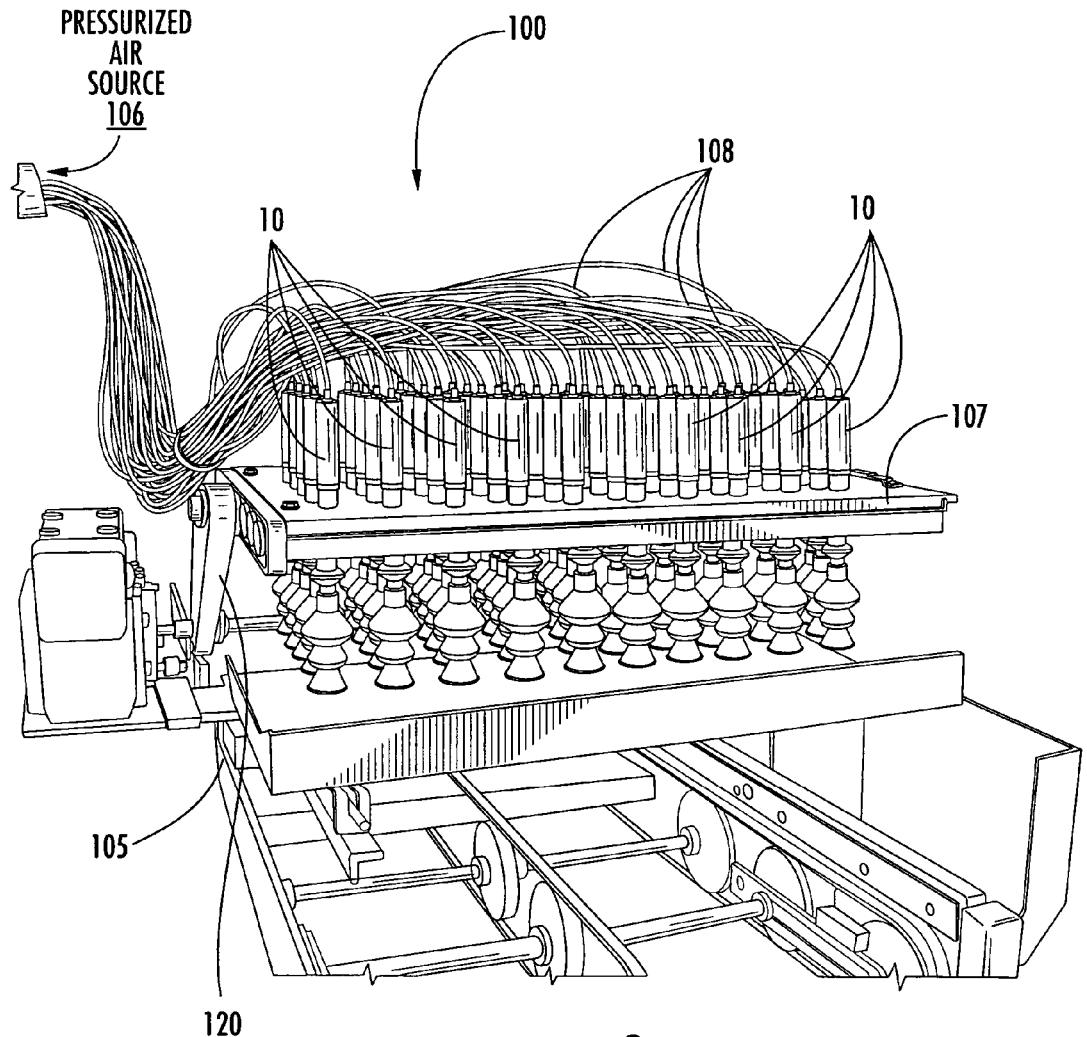
FIGS. 8–10 illustrate an apparatus for removing eggs from an egg carrier that utilizes a plurality of the egg lifting apparatus of FIG. 1, according to embodiments of the present invention.
Figure 9:
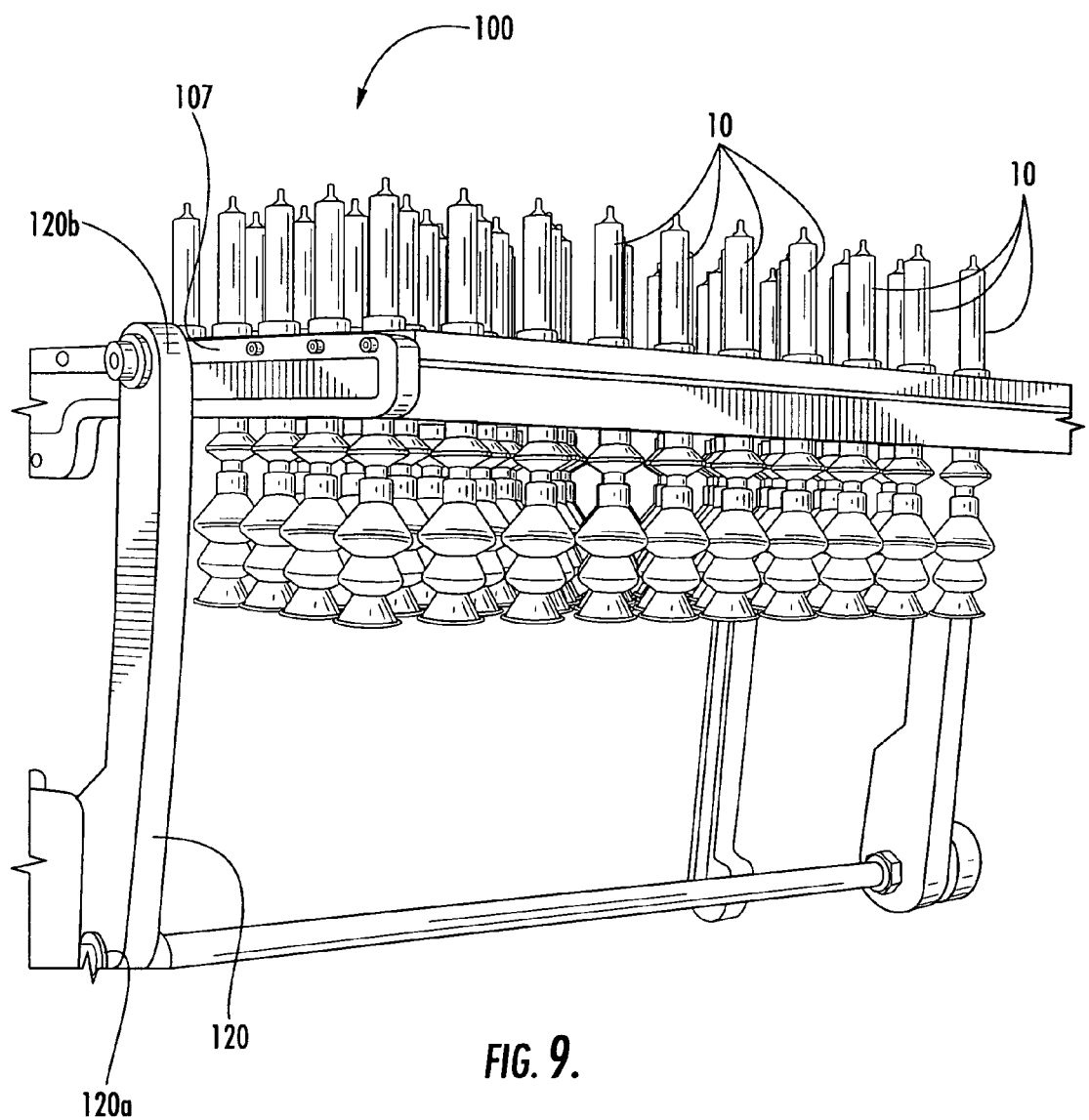
Figure 10:
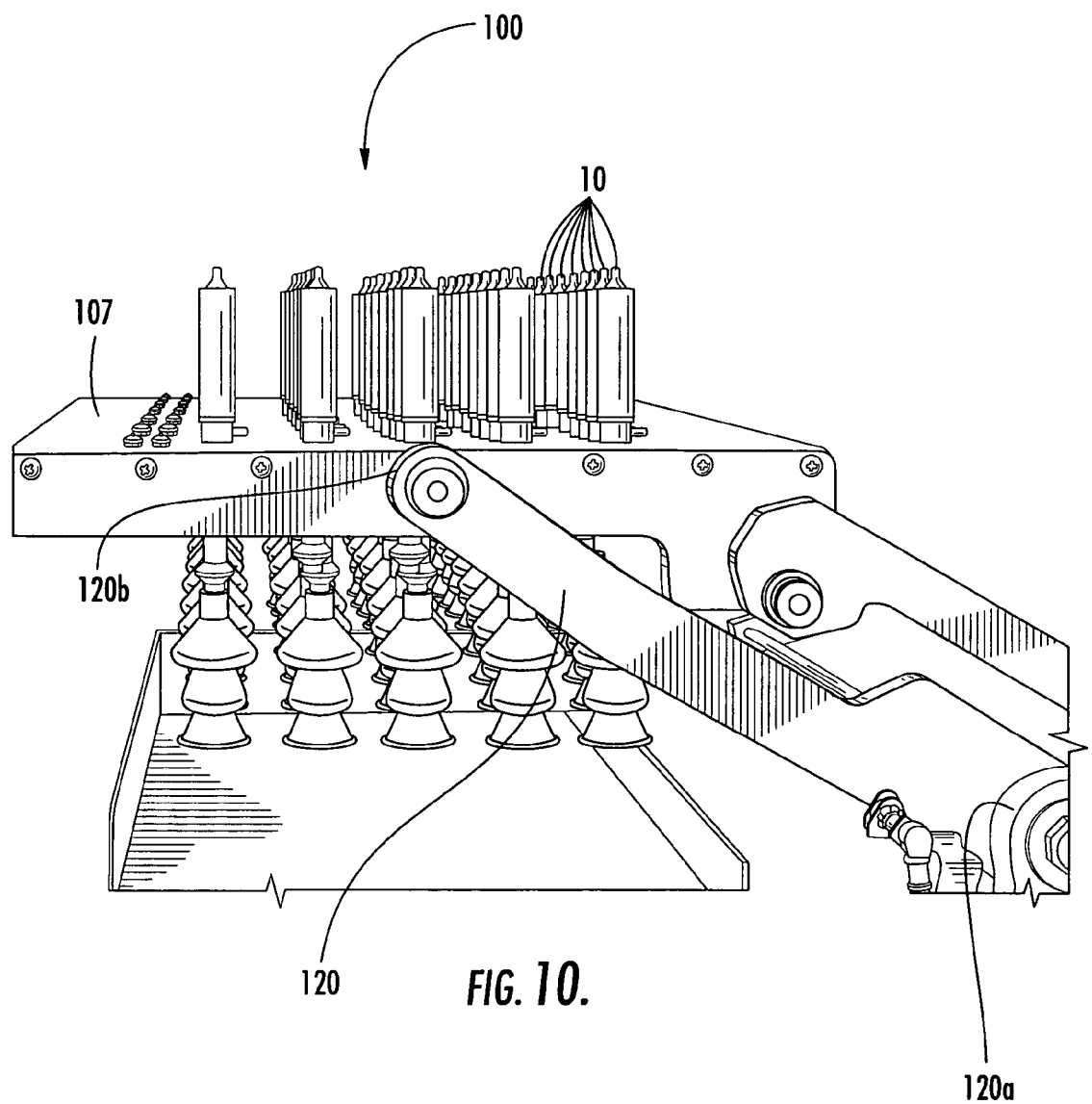

Referring to FIGS. 8–10, an apparatus 100 for removing eggs from an egg carrier (e.g., an egg flat), according to embodiments of the present invention is illustrated. The apparatus 100 includes a frame 105, a pressurized air source 106, and a platform 107 supporting an array of egg lifting devices 10 as described above. The pressurized air source 106 is in communication with the plunger housing first opening (54*a*, FIG. 5) of each egg lifting apparatus 10 via tubing. When air is supplied to a respective egg lifting apparatus 10, the flexible vacuum cup 40 is lowered as a result of the plunger moving to an extended position and vacuum is produced in the interior 41 of the flexible vacuum cup 40. The illustrated apparatus 100 further includes an arm 120 pivotally secured at one end 120*a* to the frame 105 and rotationally secured at an opposite end 120*b* to the platform 107. The arm 120 pivots between first and second positions to pick up and transfer selected eggs from an egg carrier. The platform 107 is positioned above a first location when the arm 120 is in the first position, and the platform 107 is positioned above a second location adjacent the first location when the arm 120 is in the second position. The plunger 60 for each egg lifting apparatus 10 only extends down for eggs to be picked up. Accordingly, the flexible vacuum cups 40 only come into contact with the same type of egg (i.e., either live or non-live). For example, only live eggs may be lifted and transferred. Alternatively, only non-live eggs may be lifted and removed. Alternatively, all eggs may be lifted and either live eggs or non-live eggs are controllably released. Embodiments of the present invention are not limited to the illustrated apparatus 100 and/or operation of arm 120 and platform 107. Moreover, embodiments of the present invention are not limited to an arm 120 that is rotationally or pivotally secured to the frame. Any type of member that serves the function of arm 120 may be utilized.

Figure 11:
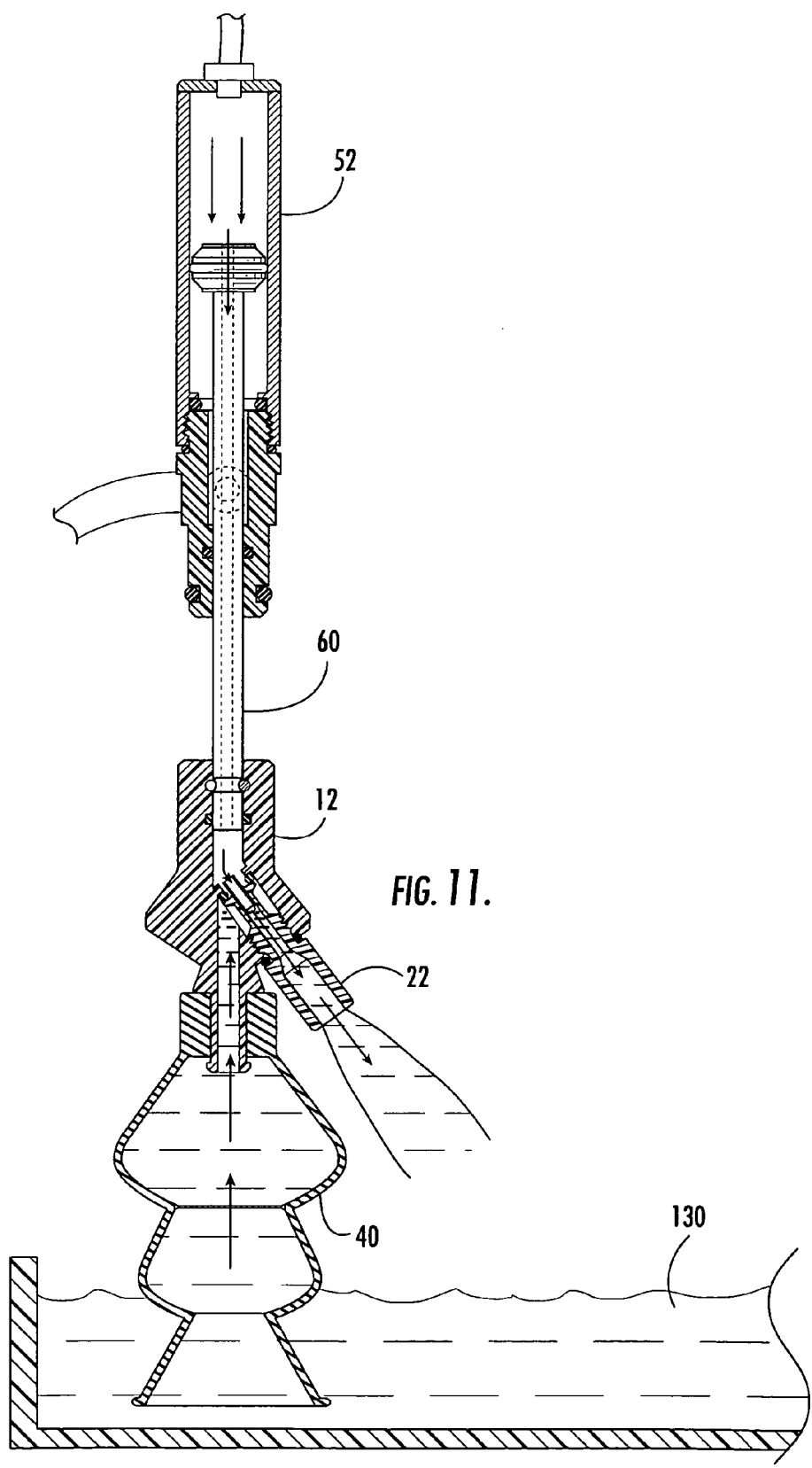
FIG. 11 illustrates the flexible vacuum cup of the egg lifting apparatus of FIG. 1 being immersed in a bath of cleaning solution for cleaning, according to embodiments of the present invention.

Referring to FIG. 11, each individual egg lifting apparatus can be cleaned by extending each respective plunger 60 such that the flexible vacuum cup 40 is immersed in a bath of cleaning solution 130. Vacuum is induced within the interior 41 of the vacuum cup 40 by forcing air flow through the vacuum housing first passageway 16 and through the venturi assembly 22, as described above. Soluble particulate matter and other contaminants are pulled upwardly through the second passageway 20 of the vacuum housing 12 and out the venturi assembly 22. Non-soluble matter can clog aperture 30, but the entire venturi assembly 22 can be removed and cleaned.

According to other embodiments of the present invention, a screen 80 (FIG. 3) may be positioned within the interior 41 of each flexible vacuum cup 40 to prevent foreign matter from being pulled into the second passageway 20 of the vacuum housing 22 and potentially clogging the vacuum housing 22. However, a screen 80 is not required.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A method of removing eggs from a carrier containing a plurality of eggs, the method comprising:

selecting one or more eggs to be removed from the carrier; and removing the selected one or more eggs from the carrier via an egg removal apparatus, wherein the egg removal apparatus comprises a pressurized air source, and an array of egg lifting devices, wherein each egg lifting device in the array is configured to remove a respective egg from the carrier, and wherein a respective one of the egg lifting devices lifts a respective one of the selected one or more eggs from the carrier upon selectively receiving air from the pressurized air source;

wherein each egg lifting device comprises:

a vacuum housing comprising first and second passageways;

a venturi assembly in fluid communication with the first and second passageways, wherein the venturi assembly produces subatmospheric pressure within the second passageway upon the flow of air through the first passageway; and a flexible cup secured to the vacuum housing, wherein the flexible cup comprises an interior that is in fluid communication with the vacuum housing second passageway, wherein the flexible cup is configured to engage and retain an egg in seated relation therewith when subatmospheric pressure is provided within the flexible cup interior via the vacuum housing second passageway;

moving the array of egg lifting devices from a position overlying the egg carrier to a position adjacent the egg carrier;

stopping the selective flow of pressurized air from the pressurized air source to the respective egg lifting devices such that the one or more eggs are released from the egg lifting devices;

immersing one or more of the flexible cups of the array of egg lifting devices in a bath of cleaning solution; and inducing vacuum within the interior of each immersed vacuum cup by forcing air flow through the vacuum housing first passageway, wherein contaminants are pulled upwardly through the second passageway and out the venturi assembly.

2. The method of claim 1, wherein the venturi assembly is removably secured to the vacuum housing.

3. The method of claim 1, wherein the flexible cup is removably secured to the vacuum housing.

4. The method of claim 1, further comprising a screen positioned within the interior of the flexible cup, wherein the screen is configured to prevent foreign matter from being pulled into the second passageway of the vacuum housing.

5. The method of claim 1, wherein selecting an egg to be removed from the carrier comprises candling the eggs in the carrier.

6. A method of removing eggs from a carrier containing a plurality of eggs, the method comprising:

selecting one or more eggs to be removed from the carrier; and removing the selected one or more eggs from the carrier via an egg removal apparatus, wherein the egg removal apparatus comprises:
 a pressurized air source; and
 an array of egg lifting devices, each egg lifting device comprising:
  a vacuum housing comprising first and second passageways;
  a venturi assembly in fluid communication with the first and second passageways, wherein the venturi assembly produces subatmospheric pressure within the second passageway upon the flow of air through the first passageway; and
  a flexible cup secured to the vacuum housing, wherein the flexible cup comprises an interior that is in fluid communication with the vacuum housing second passageway, wherein the flexible cup is configured to engage and retain an egg in seated relation therewith when subatmospheric pressure is provided within the flexible cup interior via the vacuum housing second passageway, wherein each egg lifting device in the array is configured to remove a respective egg from the carrier, and wherein a respective one of the egg lifting devices lifts a respective one of the selected one or more eggs from the carrier upon selectively receiving air from the pressurized air source;

moving the array of egg lifting devices from a position overlying the egg carrier to a position adjacent the egg carrier;

stopping the selective flow of pressurized air from the pressurized air source to the respective egg lifting devices such that the one or more eggs are released from the egg lifting devices;

immersing one or more the flexible cups of the array of egg lifting devices in a bath of cleaning solution; and inducing vacuum within the interior of each immersed vacuum cup by forcing air flow through the vacuum housing first passageway, wherein contaminants are pulled upwardly through the second passageway and out the venturi assembly.

7. The method of claim 6, wherein the venturi assembly is removably secured to the vacuum housing.

8. The method of claim 6, wherein the flexible cup is removably secured to the vacuum housing.

9. The method of claim 6, further comprising a screen positioned within the interior of the flexible cup, wherein the screen is configured to prevent foreign matter from being pulled into the second passageway of the vacuum housing.

10. The method of claim 6, wherein selecting an egg to be removed from the carrier comprises candling the eggs in the carrier.

* * * * *